(12) United States Patent
Gyllenhammar et al.

(10) Patent No.: US 12,222,726 B2
(45) Date of Patent: *Feb. 11, 2025

(54) PLATFORM FOR PATH PLANNING SYSTEM DEVELOPMENT FOR AUTOMATED DRIVING SYSTEM

(71) Applicant: Zenseact AB, Gothenburg (SE)

(72) Inventors: Magnus Gyllenhammar, Pixbo (SE); Carl Zandén, Lindome (SE); Majid Khorsand Vakilzadeh, Mölndal (SE)

(73) Assignee: Zenseact AB, Gothenburg (SE)

( * ) Notice: Subject to any disclaimer, the term of this patent is extended or adjusted under 35 U.S.C. 154(b) by 274 days.

This patent is subject to a terminal disclaimer.

(21) Appl. No.: 17/729,447

(22) Filed: Apr. 26, 2022

(65) Prior Publication Data
US 2022/0350338 A1 Nov. 3, 2022

(30) Foreign Application Priority Data
Apr. 29, 2021 (EP) ..................................... 21171217

(51) Int. Cl.
*G05D 1/00* (2024.01)
(52) U.S. Cl.
CPC ......... *G05D 1/0221* (2013.01); *G05D 1/0088* (2013.01); *G05D 1/0214* (2013.01); *G05D 1/0217* (2013.01)
(58) Field of Classification Search
CPC .. G05D 1/0214; G05D 1/0088; G05D 1/0217; G05D 1/0221; G05D 1/0223
See application file for complete search history.

(56) References Cited

U.S. PATENT DOCUMENTS

| | | | |
|---|---|---|---|
| 2017/0089710 A1* | 3/2017 | Slusar | G06V 20/58 |
| 2019/0302767 A1 | 10/2019 | Sapp et al. | |
| 2019/0333386 A1* | 10/2019 | Horita | G08G 1/166 |
| 2020/0174481 A1* | 6/2020 | Van Heukelom | G01C 21/3407 |
| 2020/0307561 A1 | 10/2020 | Bush et al. | |
| 2022/0051175 A1* | 2/2022 | O'Herlihy | G06V 20/52 |
| 2022/0274592 A1* | 9/2022 | Ma | B60W 60/0025 |

FOREIGN PATENT DOCUMENTS

WO 2020/056331 A1 3/2020

OTHER PUBLICATIONS

Extended European Search Report mailed Oct. 29, 2021 for European Application No. 21171217.9, 8 pages.

* cited by examiner

*Primary Examiner* — Khoi H Tran
*Assistant Examiner* — Christopher Scott
(74) *Attorney, Agent, or Firm* — Sage Patent Group

(57) ABSTRACT

The present invention relates to a method and apparatus that utilize production vehicles to develop new path planning features for Automated Driving Systems (ADSs) by using federated learning. To achieve this the "under-test" path planning module's output is evaluated in open-loop in order to produce a cost-function that is subsequently used to update or train a path planning model of the path planning module.

14 Claims, 8 Drawing Sheets

PLATFORM FOR PATH PLANNING SYSTEM DEVELOPMENT FOR AUTOMATED DRIVING SYSTEM

CROSS-REFERENCE TO RELATED APPLICATIONS

The present application for patent claims priority to European Patent Office Application Ser. No. 21171217.9, entitled "PLATFORM FOR PATH PLANNING SYSTEM DEVELOPMENT FOR AUTOMATED DRIVING SYSTEM" filed on Apr. 29, 2021, assigned to the assignee hereof, and expressly incorporated herein by reference.

TECHNICAL FIELD

The present disclosure relates to methods and systems for performance evaluation and development of a path planning module of a vehicle equipped with an Automated Driving System (ADS). In particular, the present invention relates to open-loop evaluation of a path planning module of a vehicle, and subsequent updating thereof.

BACKGROUND

During the last few years, the research and development activities related to autonomous vehicles has exploded in number and many different approaches are being explored. An increasing portion of modern vehicles have advanced driver-assistance systems (ADAS) to increase vehicle safety and more generally road safety. ADAS—which for instance may be represented by adaptive cruise control, ACC, collision avoidance system, forward collision warning, etc.—are electronic systems that may aid a vehicle driver while driving. Today, there is ongoing research and development within a number of technical areas associated to both the ADAS and Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles, free-space areas, and/or relevant signage.

Much of the current efforts for development of ADSs revolves around safely launching a first system to the market. However, once that is achieved it will be paramount to improve the system in a safe and efficient manner, both to achieve cost reductions as well as performance improvements. Generally, there are significant costs associated with the development, testing, and validation of safety of the ADS (or of "ADS features"), especially related to field tests and the understanding of how the system behaves in traffic. Moreover, there are additional challenges in terms of managing the immense amounts of data generated by ADS equipped vehicles in order to develop, test and verify various ADS features, not only from a data storage, processing and bandwidth perspective, but also from a data security/privacy perspective.

There is accordingly a need in the art for new solutions for facilitating development, testing, and/or validation of ADSs in order to continuously be able to provide safer and more performant systems. As always, the improvements shall preferably be made without significant impact on the size, power consumption and cost of the on-board system or platform.

SUMMARY

It is therefore an object of the present invention to provide a method performed by an in-vehicle computing system for automated development of a path planning module of a vehicle, a computer-readable storage medium, an apparatus for automated development of a path planning module of a vehicle, and a vehicle comprising such an apparatus, which alleviate, mitigate or completely eliminate all or at least some of the drawbacks of presently known solutions.

It is also an object of the present invention to provide solutions for facilitating development, testing, and/or validation of ADSs in order to continuously be able to provide safer and more performant systems.

These objects are achieved by means of a method performed by an in-vehicle computing system for automated development of a path planning module of a vehicle, a computer-readable storage medium, an apparatus for automated development of a path planning module of a vehicle, and a vehicle comprising such an apparatus as defined in the appended claims. The term exemplary is in the present context to be understood as serving as an instance, example or illustration.

According to a first aspect of the present invention, there is provided method performed by an in-vehicle computing system for automated development of a path planning module of an ADS-equipped vehicle. The method comprises obtaining a candidate path from the path planning module. The path planning module is configured to generate the candidate path for the vehicle based on a path planning model and data indicative of the surrounding environment of the vehicle. The data may for example be processed sensor data obtained from a perception system of the vehicle. Further, the method comprises obtaining a reference framework for evaluating the candidate path. The reference framework is configured to indicate one or more risk values associated with the candidate path when the candidate path is applied in the reference framework. The method further comprises evaluating the obtained candidate path by applying the candidate path in the reference framework in order to determine a cost function based on the one or more risk values. The cost function is indicative of a performance of the path planning module within the reference framework. The indicated performance of the path planning module may for example be a metric indicative of how "safe" the generated candidate path is. The method further comprises updating one or more parameters of the path planning model by means of an optimization algorithm configured to optimize the determined cost function.

Accordingly, the above-presented method provides for a learning platform for autonomous vehicles where the production system and sensors of the production ADS are utilized to carry out federated learning of next versions of path planning features for ADSs. Thereby readily providing advantages in terms of cost and time for development, testing, and validation of path planning features for autonomous vehicles.

According to a second aspect of the present invention, there is provided a (non-transitory) computer-readable storage medium storing one or more programs configured to be executed by one or more processors of an in-vehicle processing system, the one or more programs comprising instructions for performing the method according to any one of the embodiments disclosed herein. With this aspect of the invention, similar advantages and preferred features are present as in the previously discussed first aspect of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Further, in accordance with a third aspect of the present invention there is provided an apparatus for automated development a path planning module of an ADS-equipped vehicle. The apparatus comprises control circuitry configured to obtain a candidate path from the path planning module. The path planning module is configured to generate the candidate path for the vehicle based on a path planning model and data indicative of the surrounding environment of the vehicle. The control circuitry is further configured to obtain a reference framework for evaluating the candidate path. The reference framework is configured to indicate one or more risk values associated with the candidate path when the candidate path is applied in the reference framework. Further, the control circuitry is configured to evaluate the obtained candidate path by applying the candidate path in the reference framework in order to determine a cost function based on the one or more risk values. The cost function is indicative of a performance of the path planning module within the reference framework. Moreover, the control circuitry is configured to update one or more parameters of the path planning model by means of an optimization algorithm configured to optimize the determined cost function. With this aspect of the invention, similar advantages and preferred features are present as in the previously discussed first aspect of the invention.

Still further, in accordance with another aspect of the present invention, there is provided a vehicle comprising a set of vehicle-mounted sensors configured to monitor a surrounding environment of the vehicle. The vehicle further comprises an automated driving system (ADS) having a perception system configured to generate perception data based on sensor data obtained from one or more of the set of vehicle-mounted sensors. Further, the vehicle comprises a path planning module configured to generate the candidate path for the vehicle, and an apparatus for automated development of the path planning module according to any one of the embodiments disclosed herein. With this aspect of the invention, similar advantages and preferred features are present as in the previously discussed first aspect of the invention.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present invention is described in terms of a method, it may also be embodied in one or more processors and one or more memories coupled to the one or more processors, wherein the one or more memories store one or more programs that perform the steps, services and functions disclosed herein when executed by the one or more processors.

Figure 1:
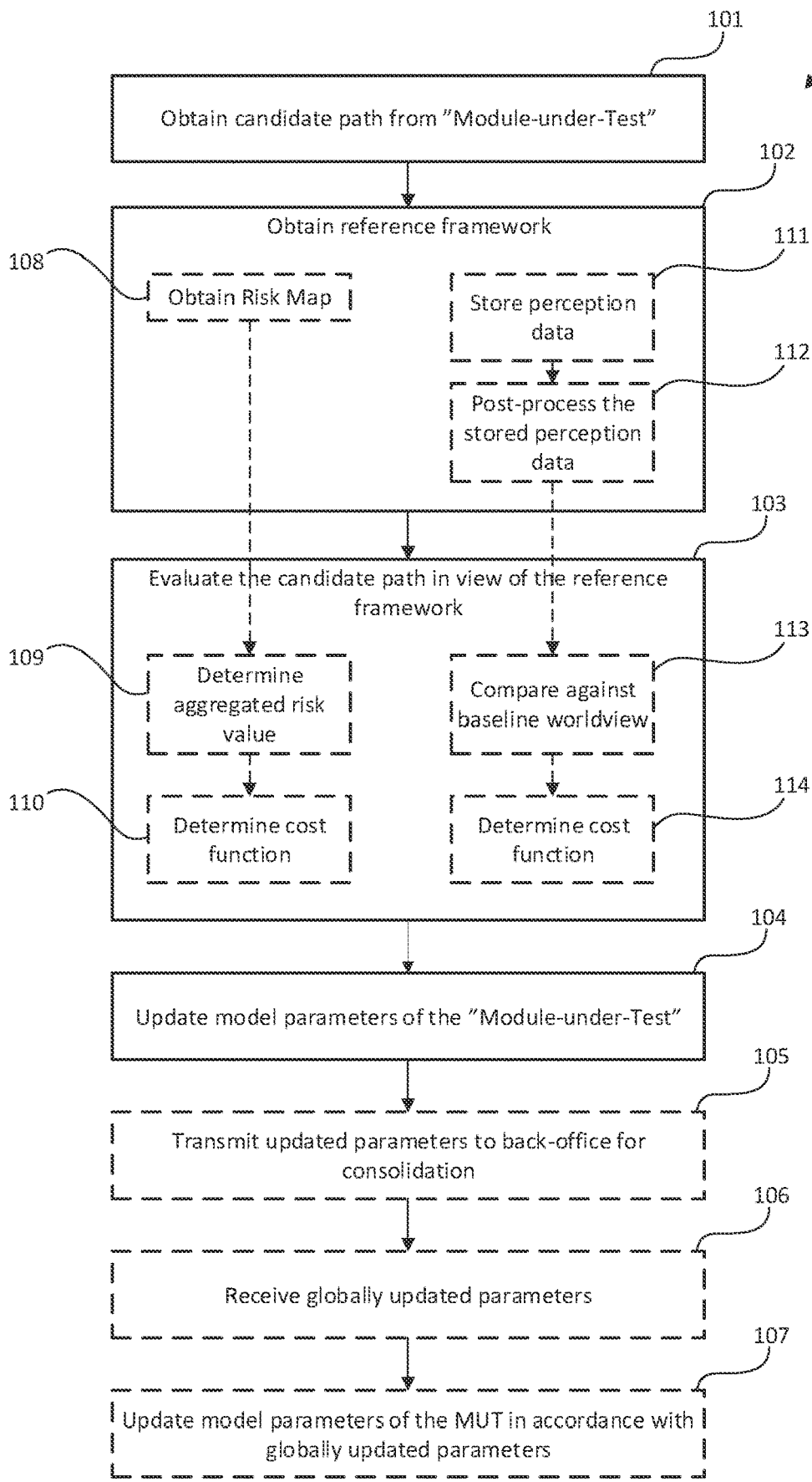
FIG. 1 is a schematic flow chart representation of a method performed by an in-vehicle computing system for automated development of a path planning module of a vehicle in accordance with an embodiment of the present invention.

FIG. 1 is a schematic flow chart representation of a method 100 performed by an in-vehicle computing system for automated development of a path planning module of a vehicle. The vehicle is equipped with an Automated Driving System (ADS), which in the present context comprises all of the different levels of automation as for example defined by the SAE J3016 levels (0-5) of driving automation, and in particular level 4 and 5. In other words, the term ADS encompasses both Advanced Driver-Assistance System (ADAS) and Autonomous Driving (AD).

More specifically, the method 100 relates to open-loop evaluation of a path planning module of a vehicle, and subsequent updating thereof. The term "open loop" evaluation may also be referred to as "shadow mode" or "sandbox mode", and may accordingly be understood as evaluation of the output of the path planning module without actuation of the generated candidate paths.

The method 100 comprises obtaining 101 a candidate path from the path planning module. The term "path planning module" may also be referred to as a "Module Under Test" (MUT), or path planning development-module, meaning that is a "new" (under development) software and/or hardware of a path planning feature for automotive applications. In other words, the path planning module may in the present context be understood as software and/or hardware configured to generate a candidate path based on perception data (e.g. raw sensor data or processed sensor data), where the path planning module is currently "under development", and not yet "in production" (e.g. not verified/validated). The vehicle or more precisely, the ADS of the vehicle, may naturally be equipped with a "production path planner", i.e. a path planning module that is part of the production platform/system that is configured to generate paths that are to be executed by the ADS of the vehicle. The term obtaining is herein to be interpreted broadly and encompasses receiving, retrieving, collecting, acquiring, and so forth.

Accordingly, the path planning module is configured to generate the candidate path for execution the vehicle based on a path planning model (e.g. a machine learning algorithm, artificial neural network, or the like) and data indicative of the surrounding environment of the vehicle. Thus, the data indicative of the surrounding environment (e.g. perception data) serves as input to the path planning model, and the output of the path planning model is one or more candidate paths. The data indicative of the surrounding environment of the vehicle may for example be perception output (e.g. fused sensor data) generated by a perception system of the vehicle. However, in some embodiments, the data indicative of the surrounding environment of the vehicle may be sensor data obtained directly from one or more vehicle-mounted sensors. Furthermore, the path planning model may also utilize the actuation capabilities of the vehicle as input. The term "actuation capability" as used herein may include one or more of a braking capacity of the vehicle, an acceleration capacity of the vehicle, a steering capacity of the vehicle, and so forth as readily appreciated by the skilled person in the art.

Further, the method 100 comprises obtaining 102 a reference framework for evaluating the candidate path. The reference framework is configured to indicate one or more risk values associated with the candidate path when the candidate path is applied in the reference framework. The reference framework may be understood as a framework where the evaluation of the candidate path is performed in the open-loop testing. In some embodiments, the reference framework is in the form of a risk map that is formed based on an actuation capability of the vehicle and a location of free-space areas in the surrounding environment. The risk map is discussed in further detail in reference to FIGS. 2-4 below. However, in some embodiments, the reference framework is in the form of a baseline worldview generated from a post-processing of the output of the production system's perception system. The post-processing and the baseline worldview are discussed in further detail in reference to FIGS. 5, 6a, and 6b below.

The method 100 further comprises evaluating 103 the obtained candidate path by applying the candidate path in the reference framework in order to determine 110, 114 a cost function based on the one or more risk values. The cost function is accordingly indicative of a performance of the path planning module within the reference framework.

Further, the method 100 comprises updating 104 one or more parameters of the path planning model by means of an optimization algorithm (e.g. gradient-based optimizers or derivative-free optimizers) configured to optimize the determined cost function. In the present disclosure, the terms cost function, loss function, and error function are used interchangeably. The purpose of the cost function as defined herein, is accordingly to provide a means to update the path planning model so to maximize desirable output and to minimize unwanted output from the path planning model. In more detail, the cost function is preferably set in relation to one or more predefined goals (i.e. predefined target values). For example, a defined risk value threshold may be used to form a "goal" for the cost function. In other words, a purpose of the cost function is to minimize the one or more risk values associated with the candidate path until a certain point. This is in order to avoid potential situations where the path planning is optimized to the level of "realizing" that the "safest" option is to stand still. However, one may also impose some fixed constraints (e.g. vehicle must move from A to B) in order to avoid such situations.

An equivalent solution would be to determine 110, 114 a corresponding "reward function" in the evaluation 103 step and update 104 the one or more model parameters of the path planning model by means of an optimization algorithm configured to maximize the determined "reward function".

The development, testing, and validation of path planning algorithms for ADSs are generally thought of as an expensive and time-consuming endeavour as the testing needs to be safe and it requires a huge effort for validation. Both of these stages (development and testing) are costly and prolongs the lead-time of delivering new path planning solutions to the market. However, it was realized by the present inventors that many of the costly steps could potentially be relieved by building on top of already released production vehicles because parts of the development, testing, and validation can be done in the production vehicles without the need for dedicated vehicles with testing personnel. Accordingly, the method and apparatus as proposed herein provides a fully-automated solution for performing open-loop development, testing, and/or validation of new path-planning modules in a sufficiently safe manner.

In other words, the present invention provides for a learning platform for autonomous vehicles where the production system and sensors of the production ADS are utilized to carry out federated learning of next versions of path planning features for ADSs. Thereby providing advantages in terms of cost and time for development, testing, and/or validation of path planning features for autonomous vehicles.

The open-loop evaluation as proposed herein may advantageously be allowed to continue iteratively as long as it appears that the open-loop learning continues to improve the path planning module at a sufficient rate. For example, one could run the open-loop evaluation until the performance of the path planning module is such that the majority (over a set period of time) of the candidate paths would be allowed to be executed with respect to their estimated risk in the reference framework. Additionally, or alternatively, the open-loop evaluation could be used until the estimated risk of the candidate paths in the reference framework (over a set period of time) is at least on par with the path planner of the production platform (or at least within some tolerance margin).

Accordingly, some of the technical advantages of the invention as disclosed herein are:
Cost-effective and time-efficient development, testing, and/or validation of new path planning features.
It is possible to capitalise on the available production resources in the launched cars to further develop, test, and/or validate the path planning system.

Further, in the scheme of federated learning, the updated 104 parameters of each of a plurality of vehicles may advantageously be consolidated in a central or cloud unit, whereby a "global update" may be pushed to the entire fleet of vehicles. Therefore, in some embodiments, the method 100 further comprises transmitting 105 the one or more updated 104 parameters of the path planning model to a remote entity (e.g. a back-office or fleet management system). Moreover, the method 100 may comprise receiving 106 a set of globally updated parameters of the path planning model of the path planning module from the remote entity. The set of globally updated parameters are accordingly based on information obtained from a plurality of vehicles comprising a corresponding path planning module. Then, the method 100 may comprise updating 107 the path planning model of the path planning module based on the received set of globally updated parameters.

Still further, in some embodiments, the step of obtaining 102 a reference framework comprises obtaining 108 a risk map of a surrounding environment of the vehicle. The risk map is formed based on an actuation capability of the vehicle and a location of free-space areas in the surrounding environment. More specifically, the actuation capability includes an uncertainty estimation for the actuation capability and the location of free-space areas comprises an uncertainty estimation for the estimated location of free-space areas.

The risk map comprises a risk parameter for each of a plurality of area segments comprised in the surrounding environment of the vehicle. Moreover, the risk map further has a temporal component indicative of a time evolution of the risk parameters of the area segments based on a predicted temporal evolution of the free-space areas for at least a duration of time defined by a predicted duration of the candidate path. Accordingly, the risk map then forms the reference framework that the obtained 101 candidate path is to be evaluated 103 against. The temporal component may for example be dependent on predicted trajectories (for at least the duration of time defined by the predicted duration of the candidate path) of dynamics objects, such as external vehicles, in the surrounding environment of the ego-vehicle.

The risk map may for example be retrieved or received from a risk map engine configured to generate the risk map based on a risk map model given one or more real-time variables (originating from one or more on-board sensors) such as e.g. current speed, vehicle properties (vehicle dimensions, vehicle weight, etc.), road surface properties, and so forth, as readily understood by the skilled person in the art. The uncertainty estimates may be derived from predefined statistical models associated with each actuation parameters, where the actuation capability is given by the mean or mode value and the uncertainty estimate is given by e.g. one or two standard deviations above or below the mean.

The free-space areas may for example be derived from sensor data of one or more vehicle-mounted sensors configured to monitor the surrounding environment of the vehicle. Nevertheless, the sensor data may also originate from other sensors in the vicinity of the vehicle, e.g. sensors mounted on other vehicles or on infrastructure elements and obtained via a V2V or V2X communication network.

Free-space areas may in the present context be understood as areas in the surrounding environment of the ego-vehicle absent of objects (e.g. other vehicles, pedestrians, barriers, animals, bicycles, static objects, etc.). Thus, the obtained location of free-space areas may be understood as estimates of areas absent of external objects (static and dynamic objects) as well as an estimate of the uncertainty of this determination, i.e. the likelihood of the determined location of the free-space area actually being true.

Moreover, in some embodiments, the location of free-space areas comprises a position of external objects located in the surrounding environment of the ego-vehicle. The estimated position of the external objects may include uncertainties of the position of the external objects, estimated trajectories of any dynamic objects of the external objects and uncertainties of the estimated trajectories of the dynamic objects. However, in some embodiments the location of free-space areas is determined by a dedicated module of the vehicle, where the dedicated module is configured to obtain sensor data indicative of the surrounding environment of the vehicle, and to derive the location of the free-space areas with respect to the vehicle based on the sensor data. Thus, there does not have to be an intermediate step or layer where objects are detected before the location of the free-space areas is obtained, i.e. the "free-space area" may be obtained directly. For example, a signal emitted by a Lidar may propagate through space for a certain distance before it is reflected from some surface, then this area between the Lidar and the surface may be defined as a "free-space area" without any operation or step to define the surface that the signal was reflected from.

Figure 2:
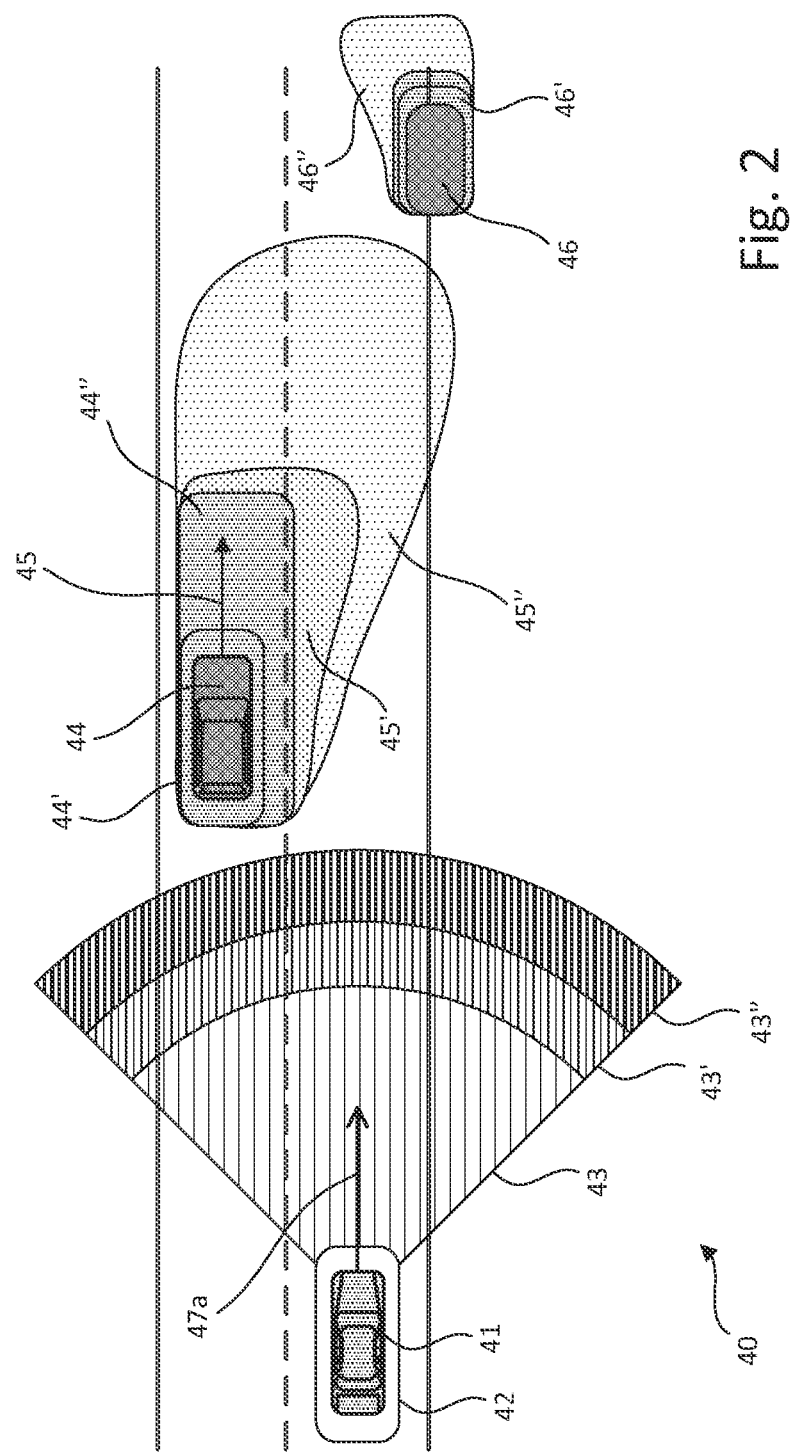
FIG. 2 is a schematic top view illustration of a risk map with some of the different components contributing to the risk map in accordance with an embodiment of the present invention.
Figure 3:
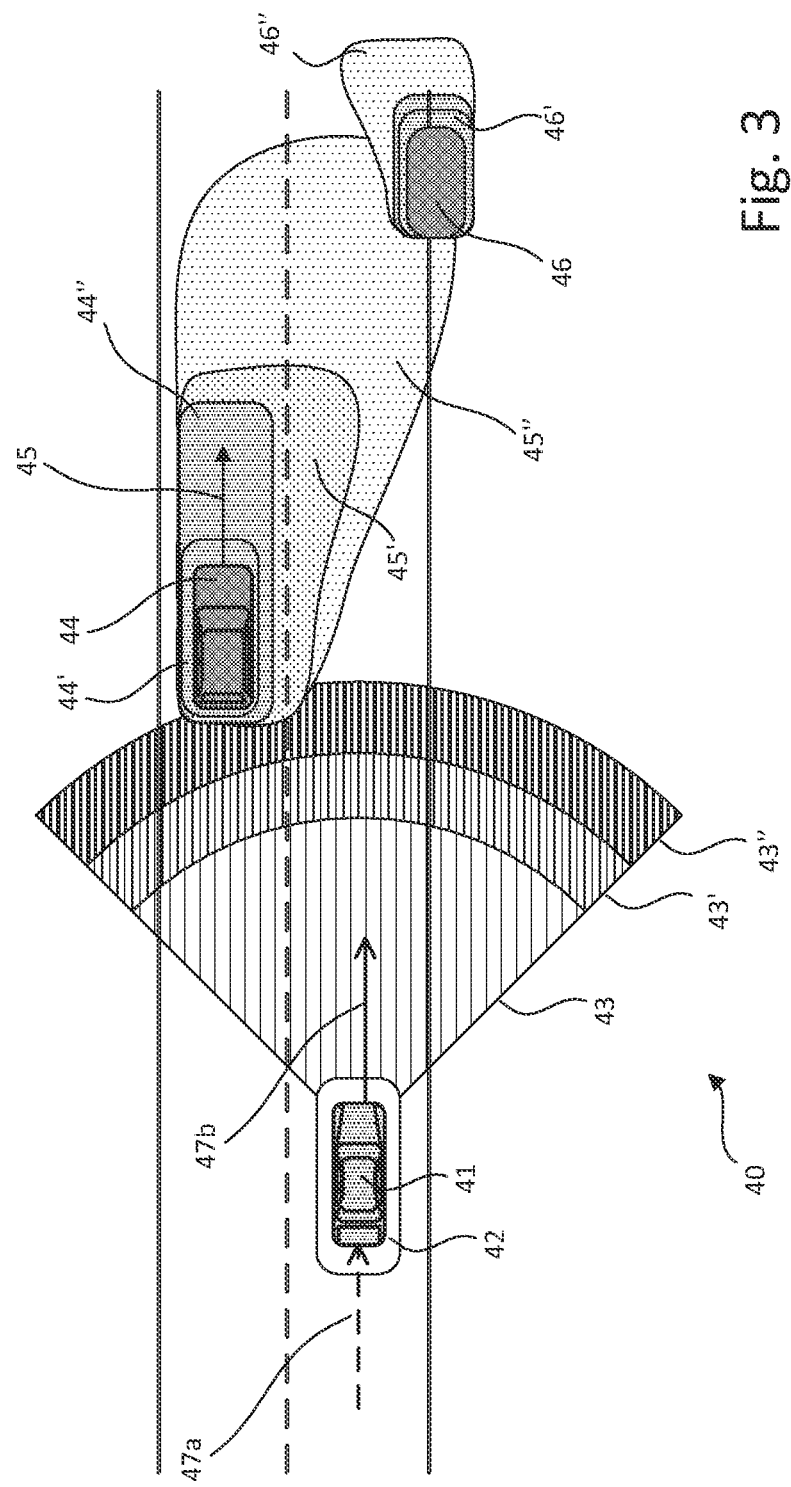
FIG. 3 is a schematic top view illustration of a risk map at a subsequent time step relative to the risk map illustrated in FIG. 2.

FIGS. 2 and 3 are two schematic top view illustrations of a risk map 40 with some example components 41-46" contributing to the risk map 40, at two consecutive time steps, in accordance with an embodiment of the present invention. Furthermore, the planned path for execution 47*a-b* of the ego-vehicle is indicated in the map 40. In more detail, dashed line arrows indicate the "candidate path" 47*a* from the preceding time instance/sample and the current candidate path 47*b* is indicated by the arrow in front of the vehicle in FIG. 3.

Further, the risk map 40 comprises information indicative of an estimated braking capacity 43 of the vehicle 41 including uncertainty estimation 43', 43" of the same. Further, the risk map 40 comprises a geographical position 41 of the ego-vehicle in the map, the uncertainty estimation 42 of the geographical position 41, a position of external objects 44, 46, uncertainties of the position of the external objects 44', 44", 46', trajectories 45 of dynamic objects 44 and uncertainties 45' 45" of the trajectories 45. The estimated uncertainties may for example be computed based on models (predefined or self-learning/machine-learning) defining a tolerance or error-margin in the measurements provided from the sensors of the vehicle (e.g. cameras, radar, LiDAR, ultrasonic sensors, etc.). Thereby, the formed risk map 40 also accounts for uncertainties inherent in such measurements of the ego-vehicle's worldview caused by for example, sensor manufacturing tolerances, noise, and so forth. Accordingly, the whole risk estimation is rendered more accurate and reliable, more accurately reflecting the actual risk exposure of the ADS of the vehicle. However, in some embodiments, the estimated uncertainties are inherently provided by the production platform's perception system and subsequently incorporated in the generated risk map 40 as readily understood by the skilled artisan.

Figure 4:
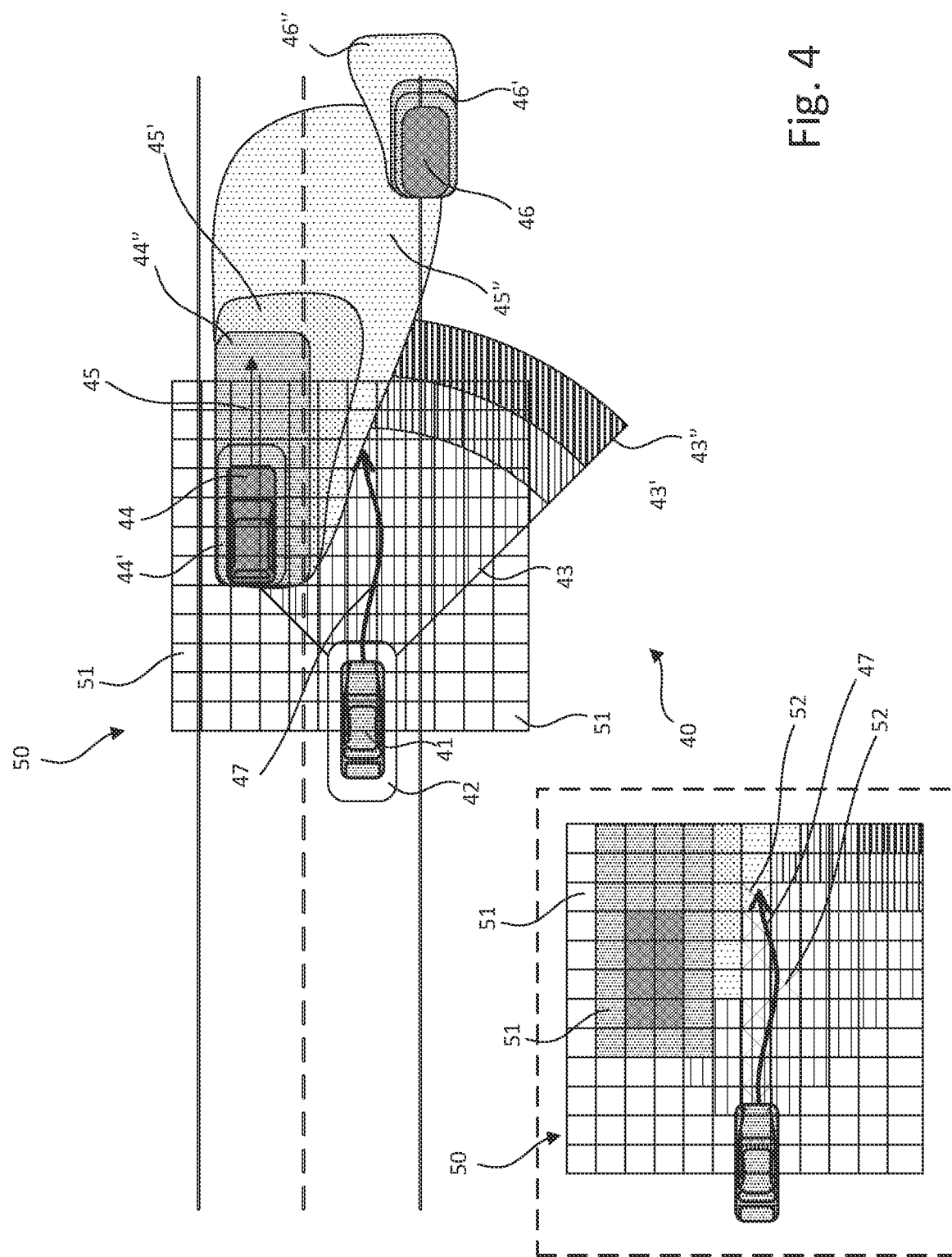
FIG. 4 is a schematic top view illustration of a risk map with area segments indicated in the form of a grid in accordance with an embodiment of the present invention.

FIG. 4 is a schematic top view illustration of a risk map at a subsequent time step/sample relative to the risk map depicted in FIG. 3, with area segments 51 indicated in the form of a grid 50 in accordance with an embodiment of the present invention. As described in the foregoing, in order to determine the aggregated risk value of a candidate path 47, one may sum and/or form an average of the risk values associated with the area segments that the planned path 47 intersects 52.

Moreover, the bottom left corner of FIG. 4 shows a schematic top view of a risk map and serves to illustrate how the total risk value may be determined in accordance with some embodiments of the present invention. In more detail, there is depicted a candidate path 47 extending through the risk map 40, which further has an overlaid grid framework 50 in order to exemplify how the area segments may be formed. As described in the foregoing, the risk map 40 has a plurality of area segments 51, each associated with a risk parameter indicative of at least one of a probability of an accident event if the path were to intersect an associated area segment and a probability of violating a predefined safety threshold. The "value" of the risk parameter is indicated in each box 51 by the pattern in the boxes 51. Accordingly, the risk map 40 depicts certain "high risk" area segments 44, "low risk" area segments 43, and values in between.

The risk of a candidate path 47 (i.e. the risk value associated with the candidate path) may be evaluated through one or more ways using the risk map 40. For example one may use the aggregated risk for the candidate path 47 when executed across the risk map 40 (i.e. integral of the path on the risk map). Accordingly, one may aggregate the risk values of the area segments 51 that the candidate path 47 intersects 52, in order to derive a compounded risk or average risk of the candidate path 47. The aggregated risk value may in some embodiments subsequently be used to define the cost function.

Reverting back to FIG. 1, the step of evaluating 103 the obtained candidate path may comprise determining 109 an aggregated risk value for the candidate path based on the risk parameters of a set of area segments intersected by the candidate path. The aggregated risk value accordingly defines the one or more risk values. Further, the step of evaluating 103 the obtained candidate path may comprise determining 110 the cost function based on the determined 109 aggregated risk value.

As mentioned, in some embodiments, the reference framework is in the form of a baseline world generated from a post-processing of the output of the production system's perception system. Thus, in some embodiments, the step of obtaining 102 a reference framework comprises storing 111, during a time period, a set of perception data obtained from a perception system of the vehicle. The perception system being configured to generate the set of perception data based on sensor data obtained from one or more vehicle-mounted sensors during the time period. A perception system (of the production platform/system) is in the present context to be understood as a system responsible for acquiring raw sensor data from on-board sensors such as cameras, LIDARs and RADARs, ultrasonic sensors, and converting this raw data into scene understanding.

The set of perception data may for example be stored or saved in a data buffer (not shown), where this set of perception data may be understood as data indicative of the vehicle's surroundings. This may for example be detected objects or objects' states and/or vehicle localization, and/or statistical and physical model predictions of future states, derived continuously and/or intermittently from a first time point T1 to a second time point T2. The time period—and correspondingly the length of the optional data buffer—may be of any arbitrary size deemed feasible, e.g. in consideration of data capacity restraints and/or characteristics of the ADS, and may for instance range from under a second up to several minutes, or more preferred, from a few seconds up to less than a minute.

Further, the step of obtaining 102 a reference framework comprises forming 112, by post-processing the set of perception data, a baseline worldview indicative of a scenario in the surrounding environment of the vehicle during the time period. Accordingly, this baseline worldview forms the reference framework. A "scenario" may be one or more momentary scenes at one or more points in time during the time period including the positions of detected objects, object classes/types, positions of lane markers, extensions of lane markers, free-space detections, and/or trajectories of detected objects in the surrounding environment of the vehicle. It should be noted that this list merely serves to exemplify the parameters included in a "scenario" and may include other parameters detectable by the vehicle's perception module as readily understood by the skilled person in the art.

Figure 5:
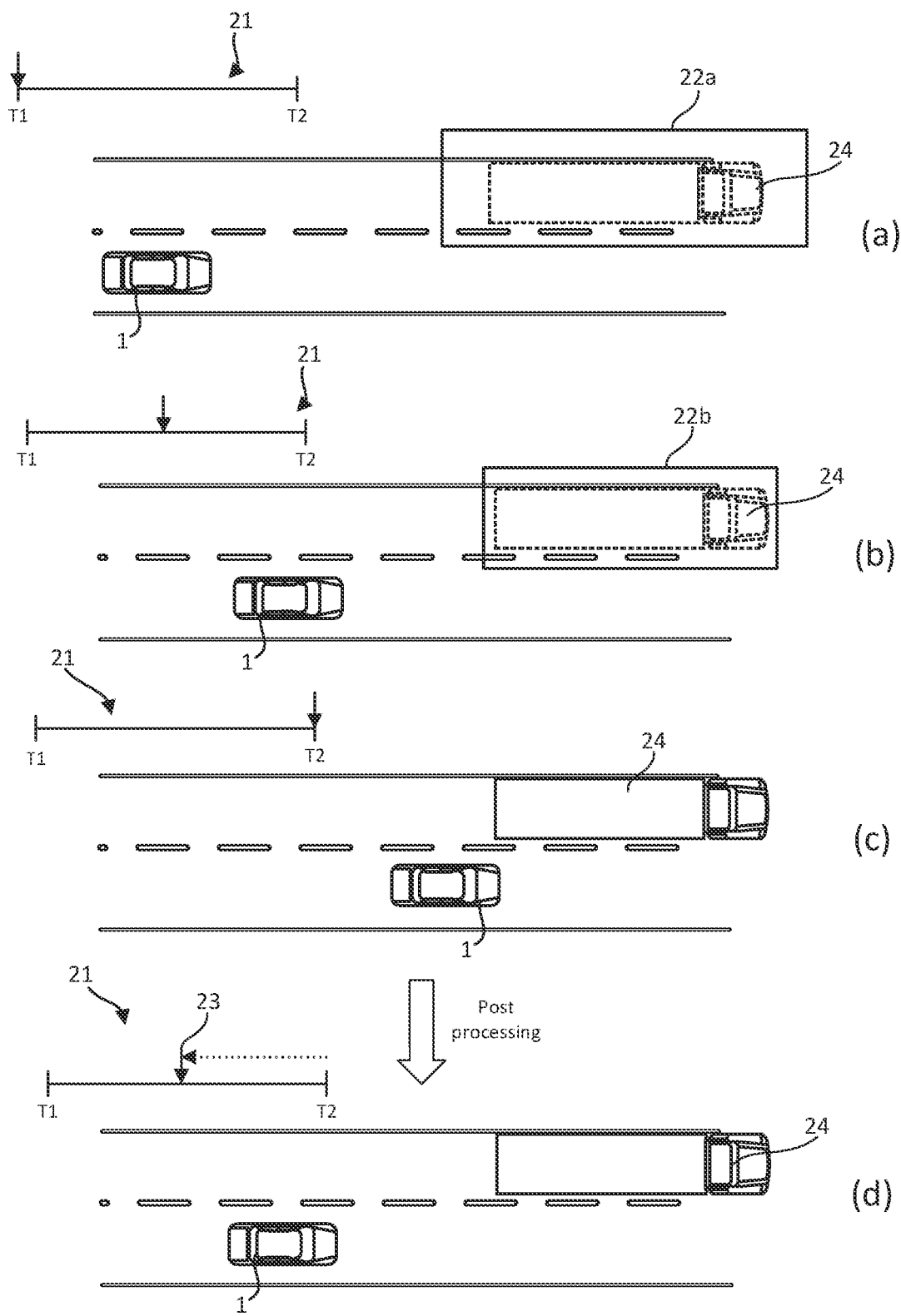
FIG. 5 is a schematic top-view illustration of a post-processing method in accordance with an embodiment of the invention in the form of a series of scenes depicting a temporal development of a vehicle approaching an object.

The post-processing step 112 will now be further exemplified in reference to FIG. 5, which depicts a series (a)-(d) of schematic top-view illustrations of a vehicle 1 moving a road portion towards an external object 24. Each illustration is associated with a point in time within the time period 21 ranging from a first moment in time T1 to a second moment in time T2.

In the first illustration (a) the vehicle 1 (may also be referred to as ego-vehicle 1) is moving towards an external object, here in the form of a truck 24, that is traveling in the same direction on an adjacent lane on the road portion. However, due to the distance to the truck 24, the vehicle's perception system/module may not be able to determine, with a sufficiently high level of accuracy, the position of the external object, and to classify it as a truck. This is indicated by the box 22*a* enclosing the truck 24, which serves to schematically indicate the "uncertainties" of the detection and classification.

At a subsequent moment in time, i.e. illustration (b) of FIG. 5, the vehicle 1 is closer to the external object, and the uncertainties regarding the external object's 24 position and class/type are reduced, as indicated by the reduced size of the box 22*b* as compared to the first box 22*a*.

At yet another subsequent moment in time, i.e. illustration (c) of FIG. 5, the vehicle's 1 perception system/module is able to accurately determine the external object's 2 position and classify it as a truck 2. More specifically, the ego-vehicle 1 is now sufficiently close to the truck 2 to be able to classify it and estimate the truck's position on the road with a higher level of accuracy as compared to when the ego-vehicle 1 was located further away from the truck.

Then, by means of a suitable filtering technique and based on the temporal development of the "scenario", one is able to establish a "baseline worldview" at an intermediate point 23 in time between T1 and T2, as indicated in the bottom illustration in FIG. 5, i.e. in illustration (d) of FIG. 5. In more detail, the filtering may for example be based on the temporal development of the trajectories, positions, etc. in combination with predefined models (e.g. motion models) of the vehicle 1 and external objects 2. This established baseline worldview may subsequently used as a "ground truth" for training and/or validation of the output obtained from the path planning module.

In accordance with some embodiments, the step of forming the baseline worldview comprises determining, based on post-processing a portion of the set of perception data ranging back from the second time point to an intermediate time point between the first time point T1 and second time point T2 the baseline worldview indicative of the surrounding environment of the vehicle. The baseline worldview accordingly being conditional on the portion of the set of perception data. Moreover, in accordance with some embodiments, the post-processing of the portion of the set of perception data comprises running the portion of the set of perception data through a backwards filter. Here, the backwards filter is configured to align a set of perceptive parameters of the set of perception data at the intermediate time point based on a development of the state(s) of the set of perceptive parameters from the intermediate time point to the second time point T2. A perceptive parameter may in the present context be an object detection estimation, an object classification estimation, an object state estimation, a road reference feature estimation, a free-space estimation, a road friction estimation, an object trajectory estimation, and/or a drivable-area estimation.

In other words, with the increased knowledge of vehicle 1 surroundings as time passes from the intermediate time point 23 to the second time point T2 and by analyzing data in reverse temporal direction, one may be able to determine, with a higher level of accuracy, the "state" (i.e. classes, positions, trajectories, etc.) of the objects in the vehicle's 1 surroundings at the intermediate time point, than it was able to do at "run-time". Thus, the post-processing may be understood as a type of automated "ex-post-facto" analysis of data indicative of the surrounding environment of the vehicle. In more detail, the post processing may for example comprise running the set of perception data through a backwards filter configured to align e.g. the objects current and predicted future states with what happened in the future—i.e. from the intermediate time point to the second time point T2. The post-processing may include further processing steps than running it through a backwards filter. More specifically, the post-processing may include fusion of data from various sensors, as well as applying backward and forward filtering on the fused information. Suitable filters for this purpose may for example be Particle filters or different types of Kalman filters (e.g. extended Kalman filters).

Thus, by performing the above-described post-processing 112 method for series of "intermediate time points", one can establish a more reliable description of the temporal evolution of the "state" of the objects in the ego-vehicle's surroundings than is possible to do at "run-time". This post-processed "description" of the surrounding environment accordingly constitutes the baseline worldview, which can then be used to evaluate the obtained 101 candidate path. Preferably, the predicted duration of the candidate path is comprised within the "duration" of the formed baseline worldview. For example, if the generated baseline worldview is indicative of a scenario in the surrounding environment of the vehicle during a time period extending from T1 to T5, the duration of the candidate path may be from T2 to T4.

Accordingly, the step of evaluating 103 the obtained 101 candidate path may comprise comparing 113 the candidate path with the baseline worldview in order to obtain the one or more risk values. Then, a cost function can be determined 114 based on the obtained one or more risk values, where each risk value is indicative of a temporal evolution of a collision threat measure for the candidate path during at least a portion of the time period.

Figure 6A:
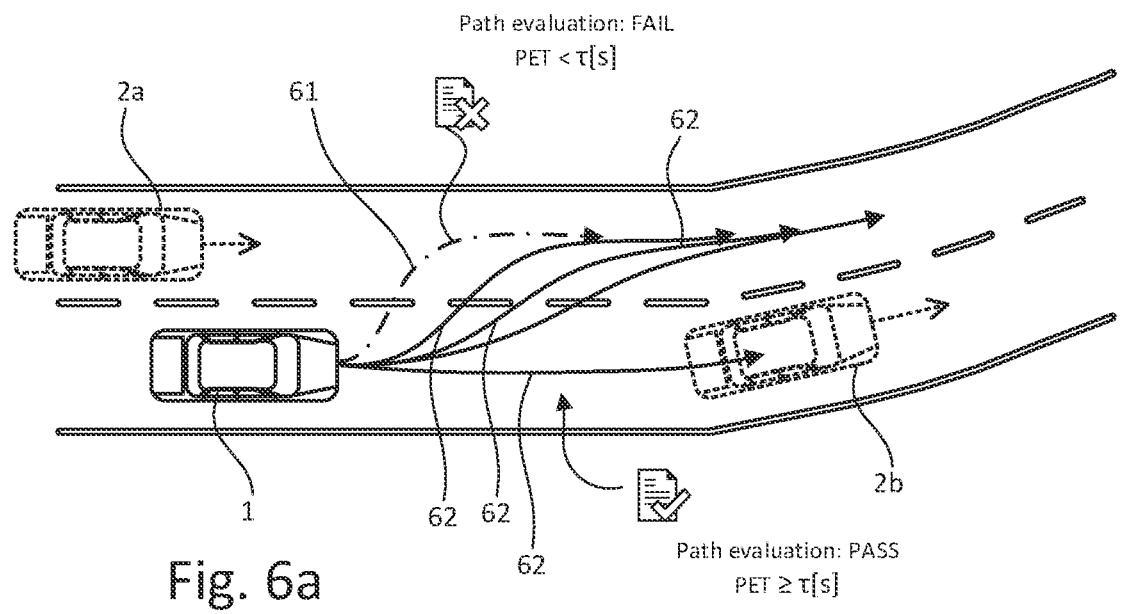
FIG. 6a is a schematic top view of a path evaluation process in view of a baseline worldview in accordance with an embodiment of the present invention.
Figure 6B:
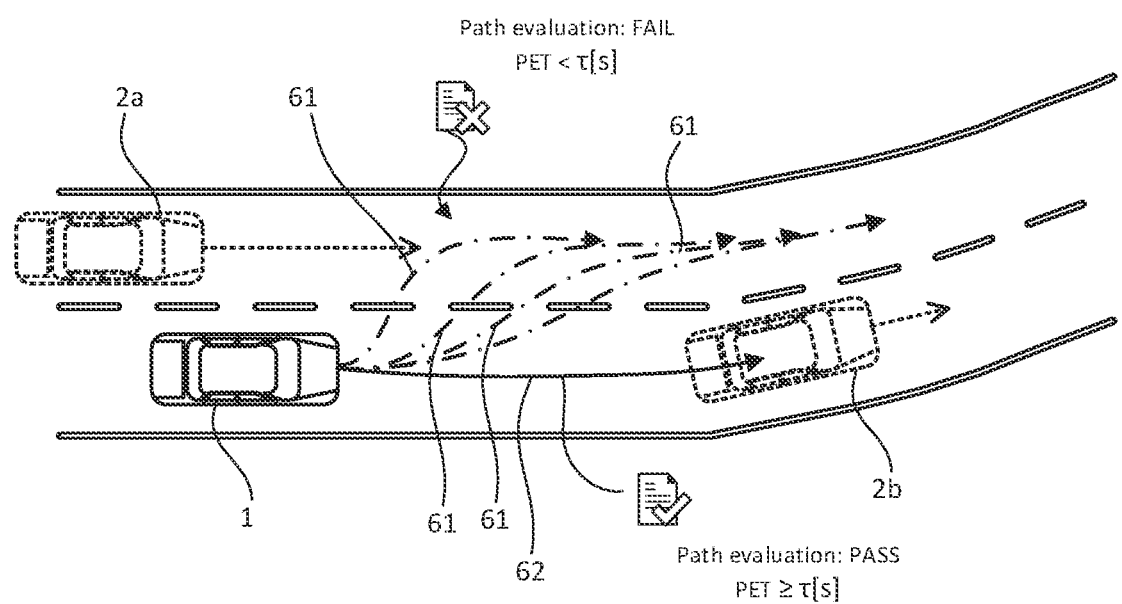
FIG. 6b is a schematic top view of a path evaluation process in view of a baseline worldview in accordance with an embodiment of the present invention.

A pair of illustrative examples of a candidate path evaluation in view of a baseline worldview are provided in FIGS. 6a-6b. In these example embodiments (FIGS. 6a-6b), Post Encroachment Time (PET) is used to define the collision threat measure. Post Encroachment Time (PET) may be understood as the time difference between a vehicle leaving the area of encroachment and a conflicting vehicle entering the same area. In other words, PET at any time point may be construed as the time gap (difference) between two objects occupying any overlap in space. Accordingly, in the present case PET is the time between the moment that the ego-vehicle leaves the path of an external vehicle and the moment that the external vehicle reaches the path of the ego-vehicle, or vice versa.

Thus, FIGS. 6a and 6b are schematic top-view illustrations of an ADS-equipped vehicle 1 comprising an apparatus for automated development of a path planning module in accordance with an embodiment of the invention. More specifically, FIGS. 6a and 6b depict two different situations where PET is used to perform a pass/fail evaluation of a plurality of candidate paths 61, 62 generated by the path planning module of the vehicle 1.

However, PET may be used as a factor in order to determine a cost function using PET so to maximize the PET up until a set level as it may not be desirable to maximize PET infinitely. Thus, the cost may be defined as max (−PET, −PET$_{max, value}$) or −min (PET, PET$_{max, value}$).

When utilizing the baseline worldview as the reference framework, a defined performance value (i.e. the collision threat measure) is required to perform the evaluation. This performance value is accordingly calculated after the situation has been post-processed in accordance with the methodology described in the foregoing. It should be noted that PET is only one example of an applicable performance value/collision threat measure, and that other metrics may be utilized such as e.g. Brake-Threat Number (BTN) and Steer-Threat Number (STN) as readily understood by the skilled artisan.

In the first situation, depicted in FIG. 6a, the ego-vehicle's 1 path planning module 1 (i.e. the Module-Under-Test) generates a number of candidate paths 61, 62 based on its path planning model and data indicative of the surrounding environment of the vehicle. These candidate paths may then be stored (in e.g. a data buffer of a suitable length) similarly as the perception data generated by the production platform's perception system that is to be used for the post-processing and generation of the baseline worldview. Once the baseline worldview has been formed over a suitable time period, the candidate paths 61, 62 are evaluated based on a PET threshold T. As indicated in FIG. 6a depicting the "first" situation, one of the candidate paths 61 fails the evaluation, while the remaining paths 62 pass the evaluation.

In the "second" situation, depicted in FIG. 6b, the external vehicle 2a traveling in the neighbouring lane is traveling at a higher speed as compared to the first situation depicted in FIG. 6a. Thus, the candidate paths that involve a change of lanes to the left-most lane are affected, which is indicated by a higher number of candidate paths 61 that failed the evaluation. It should be noted that the depicted examples in FIGS. 6a and 6b are simplified examples of a binary evaluation (pass/fail), and that further parameters may be used in the evaluation to determine the one or more risk values for each candidate path.

Moreover, it should be noted that in neither of the two evaluation processes (risk map/post-processing) is the candidate path actually executed by the ADS of the vehicle. Moreover, the cost function for the open loop learning may be constructed based on any combination of the results from these two evaluation processes. Thus, in some embodiments, the reference framework is in fact two reference frameworks, one defined by the risk map and one defined by the baseline worldview generated by the post-processing process.

Executable instructions for performing these functions are, optionally, included in a non-transitory computer-readable storage medium or other computer program product configured for execution by one or more processors.

Figure 7:
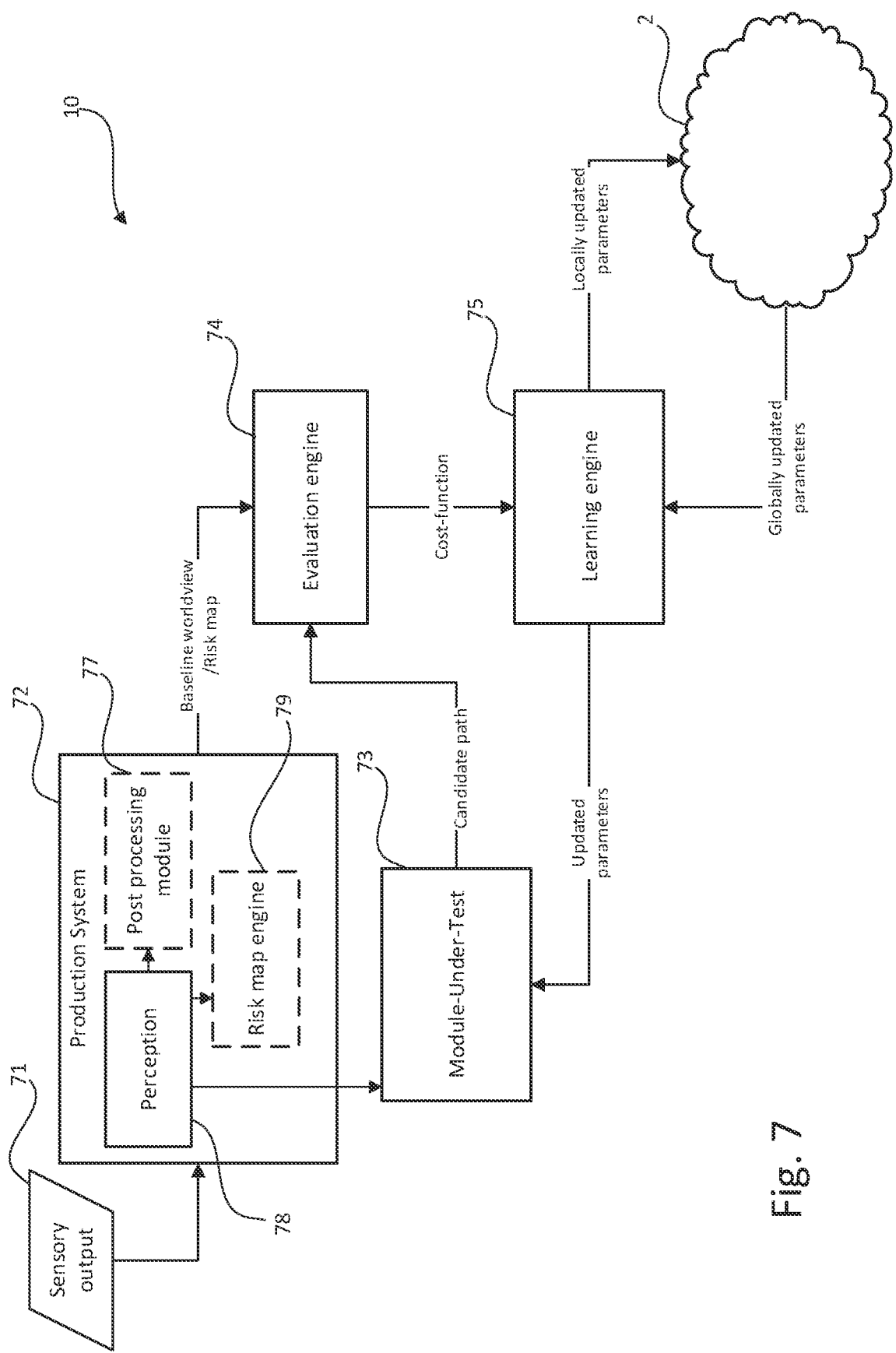
FIG. 7 is a schematic block diagram representation of a system for automated development a path planning module of a vehicle in accordance with an embodiment of the present invention.

FIG. 7 is a schematic block diagram representation of an apparatus or system 10 for automated development of a path planning module 73 of an ADS-equipped vehicle in accordance with an embodiment of the present invention. In general, FIG. 7 depicts the flow of information through exposure to an event in the vehicle surroundings, to the path evaluation processes, and further to the transmission and subsequent consolidation in the "back-office" 2. The apparatus/system 10 comprises various control circuitry configured to perform the functions of the methods disclosed herein, where the functions may be included in a non-transitory computer-readable storage medium or other computer program product configured for execution by the control circuitry. FIG. 7 serves to better elucidate the present invention by depicting various "modules" each of them linked to one or more specific functions described in the foregoing.

It should be noted that the "candidate path" that is compared in the "evaluation engine" 74 may comprise a plurality of candidate paths.

The system 10 has a path planning module 73 that is configured to generate the candidate path for the vehicle based on a path planning model and data indicative of the surrounding environment of the vehicle (such as e.g. perception data generated by a perception system 78 of the vehicle). Accordingly, the perception system 78 is configured to generate a perception output based on sensor data 71 obtained from one or more vehicle-mounted sensors during the time period. The sensor data 71 may for example output from one or more of a RADAR device, a LIDAR device, a camera, and ultrasonic sensor, and so forth. In other words, a "perception system" (i.e. the perception system of the production platform) is in the present context to be understood as a system responsible for acquiring raw sensor data from on-board sensors such as cameras, LIDARs and RADARs, ultrasonic sensors, and converting this raw data into scene understanding including state estimates and predictions thereof.

The vehicle's production platform/system 72 is configured to supply a reference framework for evaluating the candidate path. The reference framework is configured to indicate one or more risk values associated with the candidate path when the candidate path is applied in the reference framework. Moreover, the reference framework may be in the form of a risk map generated by a risk map engine 79 and/or a baseline worldview generated by a post-processing module 77.

Thus, in some embodiments, the perception data is stored or saved in a data buffer (not shown), where this perception data may be understood as data indicative of the vehicle's surroundings. This may for example be detected objects or objects' states and/or vehicle localization, and/or statistical and physical model predictions of future states, derived continuously and/or intermittently from a first time point T1 to a second time point T2. The time period—and correspondingly the length of the optional data buffer—may be of any arbitrary size deemed feasible, e.g. in consideration of data capacity restraints, a predicted duration of the candidate path(s), and/or characteristics of the ADS, and may for instance range from under a second up to several minutes, or more preferred, from a few seconds up to less than a minute.

Further, the production platform 72 may accordingly comprise a post-processing module 77 for forming a baseline worldview indicative of a scenario in the surrounding environment of the vehicle during the time period. The baseline worldview is formed based on the perception data generated by the perception system 78 of the production ADS. It should be noted that the term "forming, by post-processing the first set of perception data" does not necessarily mean that all of the stored data is post-processed, but should be construed as that at least a portion or at least a range of the stored perception data is post-processed.

In some embodiments, production platform 72 has a risk map engine 79 configured to generate a risk map based on an actuation capability of the vehicle and a location of free-space areas in the surrounding environment. The actuation capability includes an uncertainty estimation for the actuation capability and the location of free-space areas includes an uncertainty estimation for the estimated location of free-space areas. In other words, the risk map engine 79 is configured to compile the risk map from the detections and predictions including uncertainties from the perception system 72 and the capabilities and uncertainties reported by the vehicle platform (e.g. steering capabilities, braking capacity, etc.). The risk map may be understood as a virtual map of the surrounding environment of the vehicle with a number of defined area segments, each being associated with a corresponding risk parameter.

Moreover, the risk map further has a temporal component indicative of a time evolution of the risk parameters of the area segments based on a predicted temporal evolution of the free-space areas for at least a duration of time defined by a predicted duration of the candidate path. The predicted temporal evolution may for example be based on the perception data and one or more prediction models (e.g. trajectory predictions, statistical models, etc.).

In accordance with an illustrative example, the obtained actuation capability may comprise a braking capacity and an uncertainty estimation or a type of "error margin" of the obtained braking capacity. For example, if the obtained braking capacity is indicative of the vehicle being able to come to a complete stop (assuming emergency braking actuation) within a distance of 150 meters, then an uncertainty estimation for this estimation may include an error margin of ±15 meters (i.e. ±10%). As mentioned in the foregoing, the actuation capability may be given from statistical models of one or more actuation parameters where the uncertainty estimation for each actuation parameter may be defined by the standard deviation in those statistical models.

Further, the risk map engine 79 obtains a location of free-space areas in the surrounding environment of the vehicle (e.g. from the perception system 78 of the vehicle), where the obtained location of free-space areas comprises an uncertainty estimation for the estimated location of free-space areas. As mentioned in the foregoing, free-space areas may in the present context be understood as areas in the surrounding environment of the ego-vehicle absent of objects (e.g. other vehicles, pedestrians, barriers, animals, bicycles, static objects, etc.). Thus, the obtained location of free-space areas may comprise a determined location of external objects (static and dynamic objects), determined trajectories of dynamic objects, as well as an estimate of the uncertainty of the determinations, i.e. the likelihood of the determined location of the free-space area actually being true.

Further, the reference framework is supplied to the evaluation engine 74 configured to evaluate the obtained candidate path by applying the candidate path in the reference framework in order to determine a cost function based on the one or more risk values. The output of the cost function is accordingly indicative of a performance of the path planning module within the reference framework, or more specifically, indicative of a level of risk associated with the candidate path. Thus, in some embodiments the cost function is indicative of whether or not the generated candidate path can be considered safe (given one or more predefined criteria).

For example, the evaluation engine 74 may be configured to evaluate the candidate path by determining an aggregated risk value for the candidate path based on the risk parameters of a set of area segments intersected by the candidate path, where the aggregated risk value defines the one or more risk values associated with the candidate path. Accordingly, the evaluation engine 74 may be configured to determine the cost function based on the determined aggregated risk value.

Alternatively, or additionally, the evaluation engine 74 may be configured to evaluate the candidate path by comparing the candidate path with the baseline worldview, and determining the cost function based on the one or more risk values. Each risk value is accordingly indicative of a temporal evolution of a collision threat measure for the candidate path during at least a portion of the time period.

Further, the system 10 has a learning engine 75 configured to update one or more parameters of the path planning model by means of an optimization algorithm configured to optimize the determined cost function. Moreover, the learning engine 75 may be configured to transmit the one or more updated parameters of the path planning model of the path planning module to a remote entity 2, and then receive a set of globally updated parameters of the path planning model of the path planning module from the remote entity. The set of globally updated parameters are based on information obtained from a plurality of vehicles comprising a corresponding path planning module. Thereafter, the learning engine 75 may update the path planning model of the path planning module based on the received set of globally updated parameters. Thus may be construed as a "consolidation" process across an entire fleet of vehicles.

Figure 8:
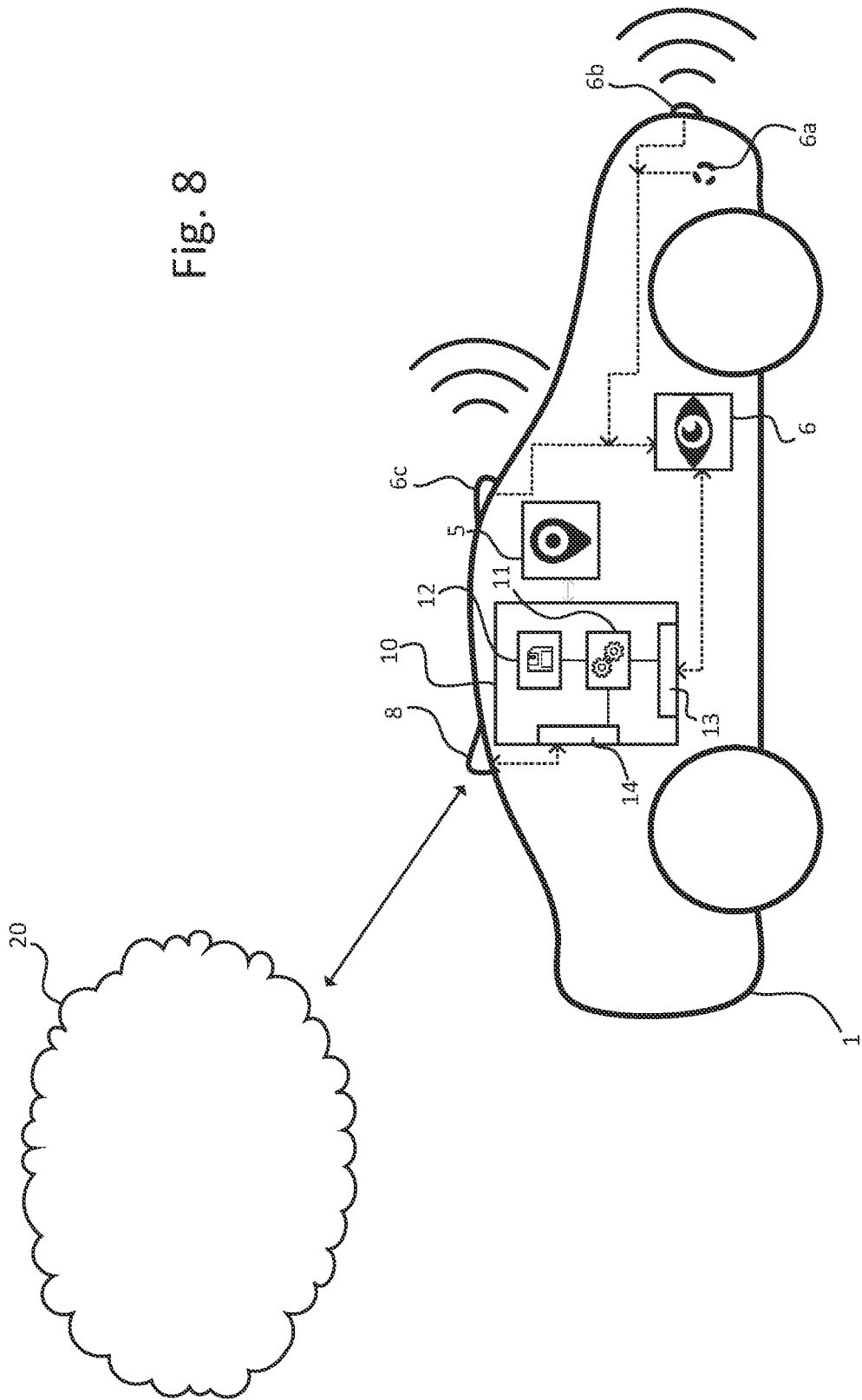
FIG. 8 is a schematic side-view of a vehicle comprising an apparatus for automated development a path planning module of a vehicle in accordance with an embodiment of the present invention.

FIG. 8 is a schematic side view illustration of a vehicle 1 comprising an apparatus 10 for automated development of a path planning module of an ADS-equipped vehicle in accordance with an embodiment of the present invention. The vehicle 1 further comprises a perception module/system 6 (i.e. the perception system of the production platform), and a localization system 5. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy.

In more detail, the perception module/system 6 may refer to any commonly known system and/or functionality, e.g. comprised in one or more electronic control modules and/or nodes of the vehicle 1, adapted and/or configured to interpret sensory information—relevant for driving of the vehicle 1—to identify e.g. obstacles, vehicle lanes, relevant signage, appropriate navigation paths etc. The exemplified perception system 6 may thus be adapted to rely on and obtain inputs from multiple data sources, such as automotive imaging, image processing, computer vision, and/or in-car networking, etc., in combination with sensory information. Such exemplifying sensory information may for instance be derived from one or more optional surrounding detecting sensors 6a-c comprised in and/or provided on-board the vehicle 1. The surrounding detecting sensors 6a-c may be represented by any arbitrary sensors adapted to sense and/or perceive the vehicle's 1 surroundings and/or whereabouts, and may e.g. refer to one or a combination of one or more of radar, LIDAR, sonar, camera, navigation system e.g. GPS, odometer and/or inertial measurement units.

The apparatus 10 comprises one or more processors 11, a memory 12, a sensor interface 13 and a communication interface 14. The processor(s) 11 may also be referred to as a control circuit 11 or control circuitry 11. The control circuitry 11 is configured to execute instructions stored in the memory 12 to perform a method f for automated development of a path planning module of a vehicle 1 according to any one of the embodiments disclosed herein. Stated differently, the memory 12 of the apparatus 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

The control circuitry 11 is configured to obtain a candidate path from the path planning module. The path planning module is configured to generate the candidate path for the vehicle based on a path planning model and data indicative of the surrounding environment of the vehicle. The control circuitry 11 is further configured to obtain a reference framework for evaluating the candidate path. The reference framework is configured to indicate one or more risk values associated with the candidate path when the candidate path is applied in the reference framework. Further, the control circuitry 11 is configured to evaluate the obtained candidate path by applying the candidate path in the reference framework in order to determine a cost function based on the one or more risk values. The cost function is indicative of a performance of the path planning module within the reference framework. Moreover, the control circuitry 11 is configured to update one or more parameters of the path planning model by means of an optimization algorithm configured to optimize the determined cost function.

Further, the vehicle 1 may be connected to external network(s) 20 via for instance a wireless link (e.g. for retrieving map data). The same or some other wireless link may be used to communicate with other vehicles 2 in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the apparatus 10) may be or include any number of hardware components for conducting data or signal processing or for executing computer code stored in memory 12. The apparatus 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The communication/antenna interface 14 may further provide the possibility to send output to a remote location (e.g. remote operator or control centre) by means of the antenna 8. Moreover, some sensors in the vehicle may communicate with the system 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, data may be sent to an external system and that system performs the steps to evaluate the candidate paths. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of obtaining a candidate path and obtaining a reference framework may be interchanged based on a specific realization. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A method performed by an in-vehicle computing system for automated development of a path planning module of a vehicle, wherein the vehicle is equipped with an Automated Driving System, ADS, the method comprising:
obtaining a candidate path from the path planning module, wherein the path planning module is configured to generate the candidate path for the vehicle based on a path planning model and data indicative of the surrounding environment of the vehicle;
obtaining a reference framework for evaluating the candidate path, the reference framework being configured to indicate one or more risk values associated with the candidate path when the candidate path is applied in the reference framework;
evaluating the obtained candidate path by applying the candidate path in the reference framework in order to determine a cost function based on the one or more risk values, the cost function being indicative of a performance of the path planning module within the reference framework; and
updating one or more parameters of the path planning model by means of an optimization algorithm configured to optimize the determined cost function.

2. The method according to claim 1, wherein the step of obtaining a reference framework comprises:
obtaining a risk map of a surrounding environment of the vehicle, wherein the risk map is formed based on an actuation capability of the vehicle and a location of free-space areas in the surrounding environment, the actuation capability including an uncertainty estimation for the actuation capability and the location of free-space areas including an uncertainty estimation for the estimated location of free-space areas,
wherein the risk map comprises a risk parameter for each of a plurality of area segments comprised in the surrounding environment of the vehicle,
wherein the risk map further has a temporal component indicative of a time evolution of the risk parameters of the area segments based on a predicted temporal evolution of the free-space areas for at least a duration of time defined by a predicted duration of the candidate path, and wherein the risk map forms the reference framework.

3. The method according to claim 2, wherein the step of evaluating the obtained candidate path comprises:
determining an aggregated risk value for the candidate path based on the risk parameters of a set of area segments intersected by the candidate path, the aggregated risk value defining the one or more risk values; and
determining the cost function based on the determined aggregated risk value.

4. The method according to claim 1, wherein the step of obtaining a reference framework comprises:
storing, during a time period, a set of perception data obtained from a perception system of the vehicle, the perception system being configured to generate the set of perception data based on sensor data obtained from one or more vehicle-mounted sensors during the time period; and
forming, by post-processing the set of perception data, a baseline worldview indicative of a scenario in the surrounding environment of the vehicle during the time period, wherein the baseline worldview forms the reference framework.

5. The method according to claim 4, wherein the step of evaluating the obtained candidate path comprises:
comparing the candidate path with the baseline worldview in order to obtain the one or more risk values; and
determining the cost function based on the obtained one or more risk values, each risk value being indicative of a temporal evolution of a collision threat measure for the candidate path during at least a portion of the time period.

6. The method according to claim 1, further comprising:
transmitting the one or more updated parameters of the path planning model of the path planning module to a remote entity;
receiving a set of globally updated parameters of the path planning model of the path planning module from the remote entity, wherein the set of globally updated parameters are based on information obtained from a plurality of vehicles comprising a corresponding path planning module; and
updating the path planning model of the path planning module based on the received set of globally updated parameters.

7. A non-transitory computer-readable storage medium storing one or more instructions configured to be executed by one or more processors of an in-vehicle processing system, the one or more instructions for performing the method according to claim 1.

8. An apparatus for automated development of a path planning module of a vehicle, wherein the vehicle is equipped with an Automated Driving System, ADS, the apparatus comprising control circuitry configured to:
obtain a candidate path from the path planning module, wherein the path planning module is configured to generate the candidate path for the vehicle based on a path planning model and data indicative of the surrounding environment of the vehicle;
obtain a reference framework for evaluating the candidate path, the reference framework being configured to indicate one or more risk values associated with the candidate path when the candidate path is applied in the reference framework;
evaluate the obtained candidate path by applying the candidate path in the reference framework in order to determine a cost function based on the one or more risk values, the cost function being indicative of a performance of the path planning module within the reference framework; and
update one or more parameters of the path planning model by means of an optimization algorithm configured to optimize the determined cost function.

9. The apparatus according to claim 8, wherein the control circuitry is configured to obtain a reference framework by:
obtaining a risk map of a surrounding environment of the vehicle, wherein the risk map is formed based on an actuation capability of the vehicle and a location of free-space areas in the surrounding environment, the actuation capability including an uncertainty estimation for the actuation capability and the location of free-space areas including an uncertainty estimation for the estimated location of free-space areas,
wherein the risk map comprises a risk parameter for each of a plurality of area segments comprised in the surrounding environment of the vehicle, wherein the risk map further has a temporal component indicative of a time evolution of the risk parameters of the area segments based on a predicted temporal evolution of the free-space areas for at least a duration of time defined by a predicted duration of the candidate path, and wherein the risk map forms the reference framework.

10. The apparatus according to claim 9, wherein the control circuitry is configured to evaluate the obtained candidate path by:

determining an aggregated risk value for the candidate path based on the risk parameters of a set of area segments intersected by the candidate path, the aggregated risk value defining the one or more risk values; and determining the cost function based on the determined aggregated risk value.

11. The apparatus according to claim 8, wherein the control circuitry is configured to obtain a reference framework by:

storing, during a time period, a set of perception data obtained from a perception system of the vehicle, the perception system being configured to generate the set of perception data based on sensor data obtained from one or more vehicle-mounted sensors during the time period; and forming, by post-processing the set of perception data, a baseline worldview indicative of a scenario in the surrounding environment of the vehicle during the time period, wherein the baseline worldview forms the reference framework.

12. The apparatus according to claim 11, wherein the control circuitry is configured to evaluate the obtained candidate path by:

comparing the candidate path with the baseline worldview; and determining the cost function based on the one or more risk values, each risk value being indicative of a temporal evolution of a collision threat measure for the candidate path during at least a portion of the time period.

13. The apparatus according to claim 8, wherein the control circuitry is further configured to:

transmit the one or more updated parameters of the path planning model of the path planning module to a remote entity;

receive a set of globally updated parameters of the path planning model of the path planning module from the remote entity, wherein the set of globally updated parameters are based on information obtained from a plurality of vehicles comprising a corresponding path planning module; and update the path planning model of the path planning module based on the received set of globally updated parameters.

14. A vehicle comprising:

a set of vehicle-mounted sensors configured to monitor a surrounding environment of the vehicle;

an automated driving system, ADS, having a perception system configured to generate perception data based on sensor data obtained from one or more of the set of vehicle-mounted sensors;

a path planning module configured to generate the candidate path for the vehicle;

an apparatus for automated development of the path planning module of the vehicle, wherein the vehicle is equipped with the ADS, the apparatus comprising control circuitry configured to:

obtain a candidate path from the path planning module, wherein the path planning module is configured to generate the candidate path for the vehicle based on a path planning model and data indicative of the surrounding environment of the vehicle;

obtain a reference framework for evaluating the candidate path, the reference framework being configured to indicate one or more risk values associated with the candidate path when the candidate path is applied in the reference framework;

evaluate the obtained candidate path by applying the candidate path in the reference framework in order to determine a cost function based on the one or more risk values, the cost function being indicative of a performance of the path planning module within the reference framework; and update one or more parameters of the path planning model by means of an optimization algorithm configured to optimize the determined cost function.

* * * * *